United States Patent
Aria et al.

(10) Patent No.: US 11,402,257 B1
(45) Date of Patent: Aug. 2, 2022

(54) SYSTEM FOR COMPENSATION OF WEIGHT SENSOR

(71) Applicant: AMAZON TECHNOLOGIES, INC., Seattle, WA (US)

(72) Inventors: Behrad Aria, Alameda, CA (US); David Buuck, Prunedale, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 195 days.

(21) Appl. No.: 16/805,291

(22) Filed: Feb. 28, 2020

Related U.S. Application Data

(60) Provisional application No. 62/938,869, filed on Nov. 21, 2019.

(51) Int. Cl.
*G01G 23/01* (2006.01)
*G01G 23/365* (2006.01)
*G01G 23/37* (2006.01)

(52) U.S. Cl.
CPC ......... *G01G 23/012* (2013.01); *G01G 23/365* (2013.01); *G01G 23/3707* (2013.01)

(58) Field of Classification Search
CPC . G01G 23/012; G01G 23/365; G01G 23/3707
See application file for complete search history.

(56) References Cited

U.S. PATENT DOCUMENTS

| | | | | |
|---|---|---|---|---|
| 4,624,331 A * | 11/1986 | Naito | ............... | G01G 23/00 177/1 |
| 4,804,052 A * | 2/1989 | Griffen | ............... | G01G 19/021 177/25.14 |
| 5,117,929 A * | 6/1992 | Nakamura | ............... | G01G 3/1414 177/185 |
| 5,172,783 A | 12/1992 | Feinland et al. | | |
| 5,789,713 A * | 8/1998 | Wakasa | ............... | G01G 23/10 177/185 |
| 5,837,946 A | 11/1998 | Johnson et al. | | |
| 5,936,206 A * | 8/1999 | Tajiri | ............... | G01G 23/10 177/25.13 |
| 6,112,162 A * | 8/2000 | Richards | ............... | G01G 23/12 702/101 |
| 6,173,619 B1 * | 1/2001 | Satake | ............... | G01L 1/2281 73/862.622 |

(Continued)

FOREIGN PATENT DOCUMENTS

JP 3465946 B2 8/1995

*Primary Examiner* — Natalie Huls
(74) *Attorney, Agent, or Firm* — Lindauer Law, PLLC

(57) ABSTRACT

An apparatus includes a platform that is supported by a first set of load cells. Output from these load cells may be adversely influenced by factors such as temperature, humidity, aging, and so forth. The device includes a second set of load cells that are unloaded, that is they do not support the platform. Output from the first set of load cells is digitized to produce first digital data while output from the second set of load cells is digitized to produce second digital data. The first digital data and the second digital data are processed to produce compensated data. For example, values of the second digital data may be subtracted from values of the first digital data to produce the compensated data. In other implementations, other processing may be used. The resulting compensated data may be used to provide highly accurate weight data about the platform.

20 Claims, 7 Drawing Sheets

(56) References Cited

U.S. PATENT DOCUMENTS

| | | | |
|---|---|---|---|
| 6,313,414 B1 | 11/2001 | Campbell | |
| 6,987,227 B2 * | 1/2006 | Wakasa | G01G 23/10 177/145 |
| 2019/0170566 A1 * | 6/2019 | Eger | G01K 7/16 |

* cited by examiner

SYSTEM FOR COMPENSATION OF WEIGHT SENSOR

PRIORITY

This application claims priority to, and the benefit of, U.S. Provisional Patent Application Ser. No. 62/938,869 filed on Nov. 21, 2019, titled "SYSTEM FOR ENVIRONMENTAL COMPENSATION OF LOAD CELLS", the contents of which are hereby incorporated by reference into the present disclosure.

BACKGROUND

Households, businesses, and others may maintain an inventory of various items that may be ordered, purchased, stored, and used. For example, items such as cleaning supplies or foodstuffs may be stored for use or consumption. Traditionally, management of the inventory for these items has involved various manual steps. For example, someone may be tasked with counting stock on hand and re-ordering. This can be further complicated if the same item is stocked in different physical locations. Standing orders for replenishment may result in overstock or stockout situations if usage varies. As a result, it is desirable to monitor quantity of items at various places.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
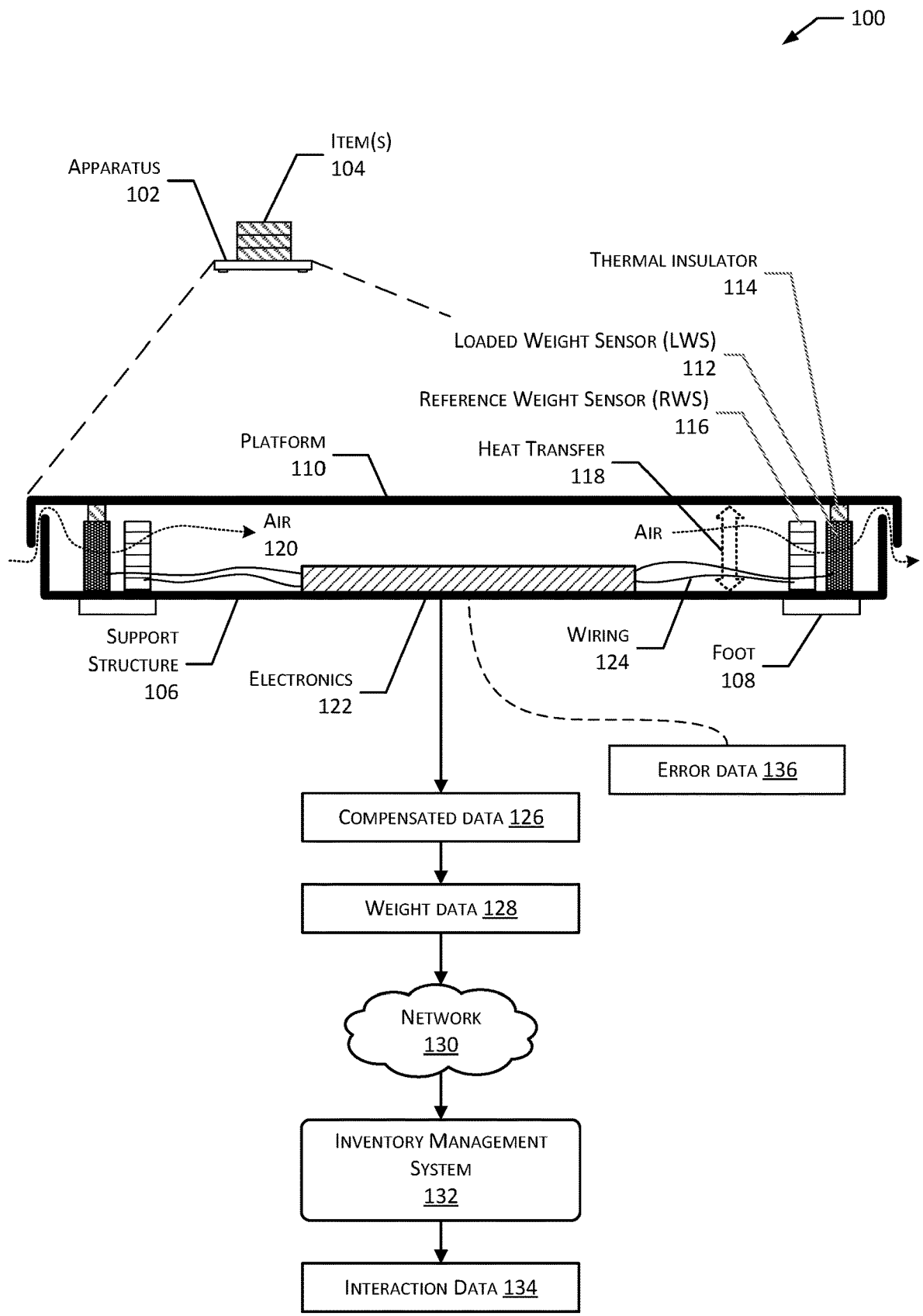
FIG. 1 illustrates an apparatus that includes weight sensors with compensation for factors such as temperature, humidity, and so forth, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A facility such as a home or business may utilize an apparatus to determine inventory levels of one or more items that are on hand. The apparatus may include a platform upon which items may be placed. For example, items may be stacked on the platform, placed into a storage rack or container that is on the platform, and so forth.

The same platform may be used to stow the same type of item, the same type of item in different bundled quantities, or different types of items. For example, a first platform may be used to store reams of copy paper while a second platform is used to store packages of coffee. In another example, the second platform may store coffee in one kilogram containers and four-packs in which four individual 1 kg containers are bundled together. In yet another example, the first platform may be used to store copy paper and coffee.

Users may perform interactions, such as removing or "picking" items from the platform or "placing" items onto the platform of the apparatus. These interactions change the total weight of the items on the platform. For example, a "pick" will reduce the total weight on the platform by the weight of the item which was removed. In another example, a "place" will increase the total weight on the platform by the weight of the item that was put on the platform. Information about a weight change from a first time to a second time may be used to determine whether an interaction is a pick or a place. In some implementations, if information about the weight of an item is known, a quantity of items involved in the interaction may be determined. For example, if the change in total weight is measured at −300 grams, and individual items are known to weigh about 100 grams, a pick of 3 items may be determined.

In some implementations additional information about the interaction may also be determined if weight values are measured at multiple points with respect to the platform. For example, if a weight sensor, such as a load cell, is located at each of the four corners of the platform, a center of gravity of the platform and the items on that platform may be determined at a given time using the four weight values from those weight sensors. Likewise, a change in weight may be used to determine where, with respect to the two-dimensional plane of the platform, a change in center of gravity took place. For example, an estimated location of where the item was picked from with respect to the platform may be determined. This information may be used to determine where on the platform an item was picked from or placed to. Based on the location, a type of item may be determined. For example, a left side of the first platform may be assigned to store copy paper while a right side is assigned to store coffee.

The weight sensors used in the apparatus may comprise load cells. A load cell may comprise one or more strain gauges affixed to a support member, such as a beam or plate. The beam is attached at a first end to a support structure while a second end or "live" end supports the platform, which is measured along with any load on the platform. Strain gauges affixed to the beam are slightly stretched or compressed, depending on their positioning, due to the change in shape of the beam and produce a change in electrical resistance. This electrical resistance may then be measured and ultimately used to determine the weight on the live end.

Depending on the various arrangements of the resistive strain gauges, a load cell may be described as "quarter-bridge", "half-bridge", or "full-bridge". Because the change in electrical resistance by the strain gauges may be very small, resistive strain gauges may be wired into a Wheatstone bridge arrangement that produces a voltage which changes in response to the changes in resistance. This change in voltage is more easily measured than the underlying small change in resistance. A "full-bridge load cell" (FBLC) has four resistive strain gauges, or their equivalent, affixed to a single beam. A "half-bridge load cell" (HBLC) has only two resistive strain gauges, or their equivalent, affixed to a single beam. A "quarter-bridge load cell" (QBLC) has only one resistive strain gauge, or its equivalent, affixed so a single beam.

During operation, a circuit including the resistive strain gauges is operated in the Wheatstone bridge arrangement. A full-bridge load cell uses a circuit which incorporates four resistive strain gauges, and is able to provide as an output a voltage indicative of the weight. For example, four QBLCs, may be combined to operate as a full-bridge load cell. Each of the four QBLCs may support a corner of the platform. In other examples, two HBLCs may be combined to operate as a full bridge load cells, a single FBLC may be used, and so forth.

Regardless of the particular configuration, the output from a load cell may change from time to time. Factors such as temperature, humidity, aging, corrosion, mechanical deformation, and so forth may result in the strain gauges producing analog output that changes even when the actual applied load does not change. For example, a reference item made of a relatively inert material, such as metal, is placed on the platform. Regardless of the change in humidity, temperature, or aging, the actual mass of the item remains the same. However, due to the factors such as changes in temperature, humidity, aging, and so forth, the load cells provide analog output that indicates a change in weight even though no change in the load has taken place. The weight as reported by the load cell may have changed, but the actual mass has remained constant.

Various techniques have been used to mitigate errors in the output from load cells. For example, some load cell designs include a temperature compensation element such as a resistor with a temperature coefficient that attempts to cancel out changes due to temperature at an analog level. However, these designs are relatively costly, may exhibit a limited temperature range within which compensation takes place, do not account for other factors such as changes in humidity, and so forth. In another example, a temperature sensor may be used and a correction applied to try and produce data that mitigates temperature changes. However, this requires costly characterization of the system which may need to be performed for particular configurations, and again fails to address other factors such as humidity or aging.

Described in this disclosure is an apparatus that uses loaded weight sensors and reference weight sensors. The loaded weight sensors determine weight of a platform and any load thereon. In one implementation the loaded weight sensor may comprise a first load cell having a first end attached to a support structure, such as a base of the apparatus, and a second end attached to the platform. The reference weight sensors are not subjected to an applied force of the weight of the platform or any load thereon. In one implementation the reference weight sensor may comprise a second load cell having a first end attached to the support structure while the second end is not attached to the platform. The reference weight sensor may be considered "unloaded" in that it may not be subject to strain from the load.

The one or more loaded weight sensors (LWS) and the one or more reference weight sensors (RWS) in the apparatus are subjected to the same factors, including but not limited to temperature, humidity, aging, vibration, corrosion, contaminants, and so forth. As a result, both the LWS and the RWS are similarly if not identically affected by these factors. For example, air circulating within the apparatus may similarly transfer heat to the LWS and RWS, changing their respective temperatures in a similar fashion. Likewise, the circulating air similarly exposes both the LWS and the RWS to the same ambient humidity, and similarly affects the sensor elements.

The first load cell and the second load cell may have the same operating characteristics and may be selected to have similar characteristics. For example, the first load cell and the second load cell may be from the same "bin" during manufacture such that their operating characteristics are within 10% of one another. Continuing the example, the first and second load cells may be part-compatible, such that one could be swapped for the other and the system would operate.

Output from the LWS is adjusted using output from the RWS to produce compensated data. For example, first analog output such as an analog signal from the LWS may be amplified and converted to first digital data. Likewise, second analog output such as an analog signal from the RWS may be amplified and converted to second digital data. In one implementation, the values of the second digital data may be subtracted from the values of the first digital data to produce the compensated data.

In other implementations, other techniques may be used to determine the compensated data. For example, during manufacture of the apparatus, a calibration value may be determined for the LWS and the RWS. The calibration value of the LWS is determined when the platform is unloaded. At a later time, such as during use, error data may be determined that indicates a variance between a current value of the RWS and the calibration value of the RWS. Because the RWS is not loaded, the current value is unaffected by the load on the platform. However, because the RWS and the LWS are affected but the same factors, they are expected to experience similar drift. The error data may be used to adjust the output of the LWS. For example, the output from the LWS may be adjusted using the calibration value of the LWS, in effect removing from consideration the weight of the platform. The resulting value may then be adjusted using the error data, providing compensated data that adjusts for factors such as age, humidity, and so forth.

The compensated data is then used to determine weight data. For example, the compensated data may comprise compensated values. These compensated values are used in conjunction with a lookup table to associate a particular compensated value with a particular weight.

Because the LWS and the RWS are subjected to the same factors, changes in the analog signals due to those factors are compensated for immediately. The RWS, being unloaded, provides a baseline or reference which represents the changes due to the various factors. The second digital data representative of the analog output from the RWS may be used in concurrent, partially concurrent, adjacent, or non-concurrent mode. For example, in a concurrent mode the first analog output and the second analog output may be acquired during the same timeslot, with the corresponding first digital data and second digital data representing that same timeslot. This allows for the compensation to operate in realtime or near-realtime, which significantly improves the mitigation of factors that have shorter duration influences or higher-frequency events. In another example, a partially concurrent mode has some overlap in the time for acquisition of the first analog output and the second analog output. In yet another example, in non-concurrent mode the first analog output and corresponding first digital data are representative of a first time slot while the second analog output and corresponding second digital data are representative of a second time slot.

By using the system described in this disclosure, the operation of the apparatus to determine a weight value is significantly improved. The resulting weight values may then be used for other operations, such as determining inventory on hand, initiating an order for replenishment, and so forth. Using the compensated data improves the accuracy of the weight data, allowing for improved confidence in the determination of inventory levels, determination of pick or place operations, and so forth.

By using the LWS and the RWS, the apparatus does not need to be zeroed during operation. For example, the use of the RWS removes the need to unload the platform and perform a zeroing operation. As a result, the apparatus may support a load for extended periods of time, and still provide accurate weight values.

The system as described provides low production cost. For example, binned load cells are easily and inexpensively acquired and assembled to produce the apparatus. The resulting apparatus does not require specialized testing or checkout to characterize the load cells, reducing production costs.

After installation, the RWS provides an ongoing source of data that is readily accessible and reduces ongoing costs. During operation, the apparatus may determine error data that adjusts for differences in the first digital data and the second digital data. During subsequent operation, the compensated data is determined without the need to unload the platform. As a result, no specialized calibration or adjustment process is required, reducing ongoing costs. The error data may also be used to determine situations such as possible failure of the apparatus. For example, if the error data exceeds a threshold value, or exhibits variations within a threshold amount of time that exceed a threshold value, the apparatus may be deemed likely to fail, and mitigating action may be taken. For example, a notification may be sent to advise an administrator that the apparatus is likely to fail.

The facility may include, or have access to, an inventory management system. The inventory management system may use data from the sensors at or near the apparatus, such as the weight data from the apparatus, to determine interactions in the facility. Interactions may comprise the user picking an item from the apparatus, placing an item at the apparatus, touching an item, and so forth. For example, the inventory management system may generate interaction data that indicates what type and quantity of item a user picked from the apparatus or a particular part thereof, and then use this interaction data to adjust the count of inventory stowed at the particular apparatus.

Other sensors may be used in the facility as well. In some implementations, cameras may acquire image data of the interaction. The image data may be processed to determine if the user picked an item, placed an item, identity of the item involved, determine a quantity involved in the interaction, and so forth. The image data may be used in conjunction with weight data from the weight sensors of the apparatus to facilitate these determinations. For example, a weight change may indicate an event such as the user performing an interaction. Based on the weight change, image data that corresponds to that time may be subsequently processed. The weight data from the weight sensors, such as total weight change, weight changes at different locations with respect to the platform, location of the weight change, and so forth may also be used in conjunction with the image data to determine interaction data. For example, the weight data and the image data may be used by the inventory management system to assess hypotheses regarding possible interactions and discard those hypotheses which are inconsistent with the observed weight data.

Illustrative System

FIG. 1 illustrates a system 100 with an apparatus 102 that can support items 104, according to some implementations. The apparatus 102 includes a support structure 106. For example, the support structure 106 may comprise a base with feet 108. The apparatus 102 includes a platform 110. The one or more items 104 may rest on the platform 110. The platform 110 may support, or be replaced with, other structures to stow items 104, such as containers, bins, hangers, and so forth.

One or more loaded weight sensors (LWS) 112 support the platform 110 with respect to the support structure 106. The LWS 112 may comprise load cells. For example, the LWS 112 may comprise four quarter bridge load cells (QBLCs), each arranged to support a corner of the platform 110. Each load cell may include a structure, such as a beam or a plate, with a fixed first end that is affixed to the support structure 106 and a "live" second end which supports the platform 110. In some implementations a thermal insulator 114 may be present between the second end of the load cell and the platform 110. The thermal insulator 114 may comprise plastic, glass, composite, or other material with a relatively low thermal conductivity.

A reference weight sensor (RWS) 116 is also shown. The RWS 116 is not subjected to an applied force of the weight of the platform 110 or any load thereon. For example, the RWS 116 may comprise a second load cell having a first end attached to the support structure 106 while the second end is not attached to the platform 110. The RWS 116 may be considered "unloaded" in that it may not be subject to strain from the load.

The weight sensors may be mounted in a first orientation with respect to the support structure 106. For example, the LWS 112 and the RWS 116 are positioned with respect to local vertical (gravity) in the same orientation. Continuing the example, if the LWS 112 and RWS 116 are beam load cells, the long axes of the beams may be oriented vertically.

Various factors may influence operation of the apparatus 102. These factors may include, but are not limited to, temperature, humidity, aging, vibration, corrosion, contaminants, and so forth. For example, heat transfer 118 may take place between the components of the apparatus 102 due to conduction, convection, radiation, and so forth. Air 120 from the ambient atmosphere comes in contact with at least the exterior surfaces of the apparatus 102 and may even enter and exit the interior of the apparatus 102. The air 120 may heat or cool the components, including the load cells in the LWS 112 and the RWS 116. These temperature changes may affect operation of the load cells. In the implementation depicted here, the thermal insulator 114 reduces heat transfer 118 between the support structure 106 and the platform 110 via conduction through the LWS 112. By reducing the heat transfer 118 of the LWS 112 using the thermal insulator 114, the similarity in the temperature of the LWS 112 to the temperature of the RWS 116 may be improved. For example, the thermal insulator 114 reduces the heat transfer 118, preventing the platform 110 from acting as a heat sink which would cool the LWS 112 to a greater degree than the RWS 116 which is not so coupled to the platform 110.

The heat transfer 118 between the weight sensors and attached structures may be configured to be within some threshold tolerance. For example, a first heat transfer value of heat transfer 118 between the support structure 106 and the LWS 112 may be within 25% of a second heat transfer value between the support structure 106 and the RWS 116. In other implementations other tolerances may be used. For example, the heat transfer values may be within 10% of each other. Likewise, the air 120 may transport moisture into or out of the interior of the apparatus, affecting operation of the load cells. By exposing the LWS 112 and the RWS 116 to the same or similar ventilation, both are similarly affected by the air 120 or any constituents or contaminants therein. For example, if the air 120 becomes more humid, both the LWS 112 and the RWS 116 will be similarly exposed and thus similarly affected.

Electronics 122 in the apparatus 102 are connected to the LWS 112 and the RWS 116. For example, wiring 124 may connect four quarter bridge load cells (QBLCs) to the electronics 122 to form the LWS 112. Likewise, the wiring 124 may connect an additional four QBLCs to the electronics 122 to form the RWS 116. The wiring 124 between the electronics 122 and the respective LWS 112 and RWS 116 may be of the same or substantially the same physical length. For example, the length of the wiring 124 between the electronics 122 and the LWS 112 may be 18 inches and the RWS 116 may be 18 inches. Using the same or substantially the same physical length may improve overall performance by providing substantially the same electrical resistance.

Data from one or more of the LWS 112 or the RWS 116 may be used to generate error data 136. For example, the error data 136 may comprise data that is indicative of the output from the RWS 116, variance between the RWS 116 output at a current time and a previous time, and so forth.

The electronics 122 may operate to determine compensated data 126 based on output from the LWS 112 and the RWS 116. For example, the compensated data 126 may comprise compensated values, each associated with a different timeslot or time interval. The compensated data 126 may then be used to determine weight data 128. For example, the compensated data 126 may comprise 24-bit values that are looked up in a lookup table to determine a weight value in kilograms. The weight data 128 may comprise one or more weight values. The electronics 122 may provide other functions, such as signal filtering. The electronics 122 and operation are discussed in more detail with regard to FIG. 2.

The apparatus 102 may be connected to a network 130. For example, the apparatus 102 may include a communication interface that allows it to establish communication with a local or wide area network. The apparatus 102 may use the network 130 to send information such as one or more of the error data 136, the compensated data 126, or the weight data 128 to another system, such as an inventory management system 132. Other information such as a device identifier, media access control address, temperature data, battery status, apparatus status, and so forth may also be sent.

In some implementations, the inventory management system 132 may assess operation of the apparatus 102. The error data 136 may be analyzed to determine changes in operation over time. For example, failure of one or more LWS 112s may be detected by observing error data 136 indicative of an increasing variance between the output of the LWS 112 and the RWS 116.

The inventory management system 132 may be configured, as described below, to perform various functions. To perform these functions, the inventory management system 132 may accept weight data 128 indicative of the weight as measured by the apparatus 102.

The inventory management system 132 may maintain and utilize item data and physical layout data. The item data comprises information about a particular type of item 104. The item data may include information indicative of a weight of a single item 104, or a package, kit, or another grouping considered to be a single item 104. The item data may include other characteristics of that type of item 104 such as: physical dimensions, characteristics about how the item 104 appears, and so forth. For example, the item data may comprise a plurality of local descriptor values generated by feature extraction algorithms, parameters for classifiers, neural network configuration data, and so forth, that characterizes the appearance of a representative one or more of the item 104.

The item data may indicate the types and quantities of items 104 that are expected to be stored at that particular apparatus 102 or a particular location on the platform 110 of an apparatus 102. The item data may include information, such as weight distribution data of the item 104, point cloud data for the item 104, and so forth.

The physical layout data may provide information indicative of where apparatus 102 are located in the facility, location of sensors, information about sensor orientation and field of view (where applicable), and so forth. For example, the physical layout data may comprise information representative of a map or floor plan of the facility with relative positions of apparatus 102, planogram data indicative of how types of items 104 are to be arranged at the apparatus 102, and so forth.

The inventory management system 132 may access one or more of the weight data 128, the item data, the physical layout data, or other data to generate interaction data 134. For example, the facility may include other sensors, such as cameras having a field of view that includes at least a portion of the apparatus 102 or another fixture. The sensors generate sensor data, such as image data from the camera. The interaction data 134 provides information about an interaction, such as a pick of an item 104 from the apparatus 102, a place of an item 104 to the apparatus 102, a touch made to an item 104 at the apparatus 102, a gesture associated with an item 104 at the apparatus 102, and so forth. The interaction data 134 may include one or more of the type of interaction, interaction location identifier indicative of the apparatus 102 at which the interaction took place, an item identifier indicative of a type of item 104 or a particular item 104, quantity change to the item 104, user identifier, and so forth. The interaction data 134 may then be used to further update the item data. For example, the quantity of items 104 on hand at a portion of the platform 110 on the apparatus 102 may be changed based on an interaction that picks or places one or more items 104.

The inventory management system 132 may perform event detection to determine if an event has taken place at the apparatus 102. Events may include a pick or place of an item 104. One or more change detection algorithms may be used to identify when the weight values have changed in such a way as to meet or exceed a threshold value. In some implementations, as described below, a steady state weight value may be nulled out, and the apparatus 102 may provide weight data 128 upon a change in weight at the platform 110. An event may include weight data 128 that begins at a start time and continues through an end time.

The platform 110 of the apparatus 102 may be divided into one or more partitioned areas. A partitioned area is an area upon the platform 110 or other portion of the apparatus 102 that is associated with a particular type of item 104. For example, the apparatus 102 depicted may have two partitioned areas, a left half and a right half. Each partitioned area may be associated with storing a different type of item 104. For example, the left half may be associated with storing reams of paper while a right half is associated with storing 1 kg packages of coffee.

The inventory management system 132 may be configured to maintain a specified level of inventory of the items 104. For example, the inventory management system 132 may receive first weight data 128 at a first time that indicates that apparatus 102(2392) has 3.2 kg of weight on the platform 110. The inventory management system 132 may determine that apparatus 102(2392) is associated with user account 9384 and is associated with storing 1 kg packages of "Morning Sunshine Coffee". Based on the per item average weight of 1 kg, it is determined that the apparatus 102(2392) is currently holding 3 of the 1 kg packages of "Morning Sunshine Coffee". Second weight data 128 is received at a later second time, indicating the apparatus 102(2392) has 2.1 kg of weight on its platform 110. The user associated with the user account 9384 has specified that when the quantity on hand of "Morning Sunshine Coffee" drops below 3, an order for a quantity of 10 1 kg packages is to be created. As a result, the inventory management system 132 generates the order to replenish the supply of "Morning Sunshine Coffee". The user associated with the user account 9384 may be prompted to approve the order, or may have given instructions for the order to be automatically placed.

The use of the LWS 112 in conjunction with the RWS 116 allows the weight data 128 provided by the apparatus 102 to be very accurate in the short and long term. As various factors such as temperature, humidity, aging, and so forth affect the LWS 112, so too is the RWS 116 affected. This allows the compensated data 126 and corresponding weight data 128 to be generated on demand with assurance as to the veracity of the compensation.

Figure 2:
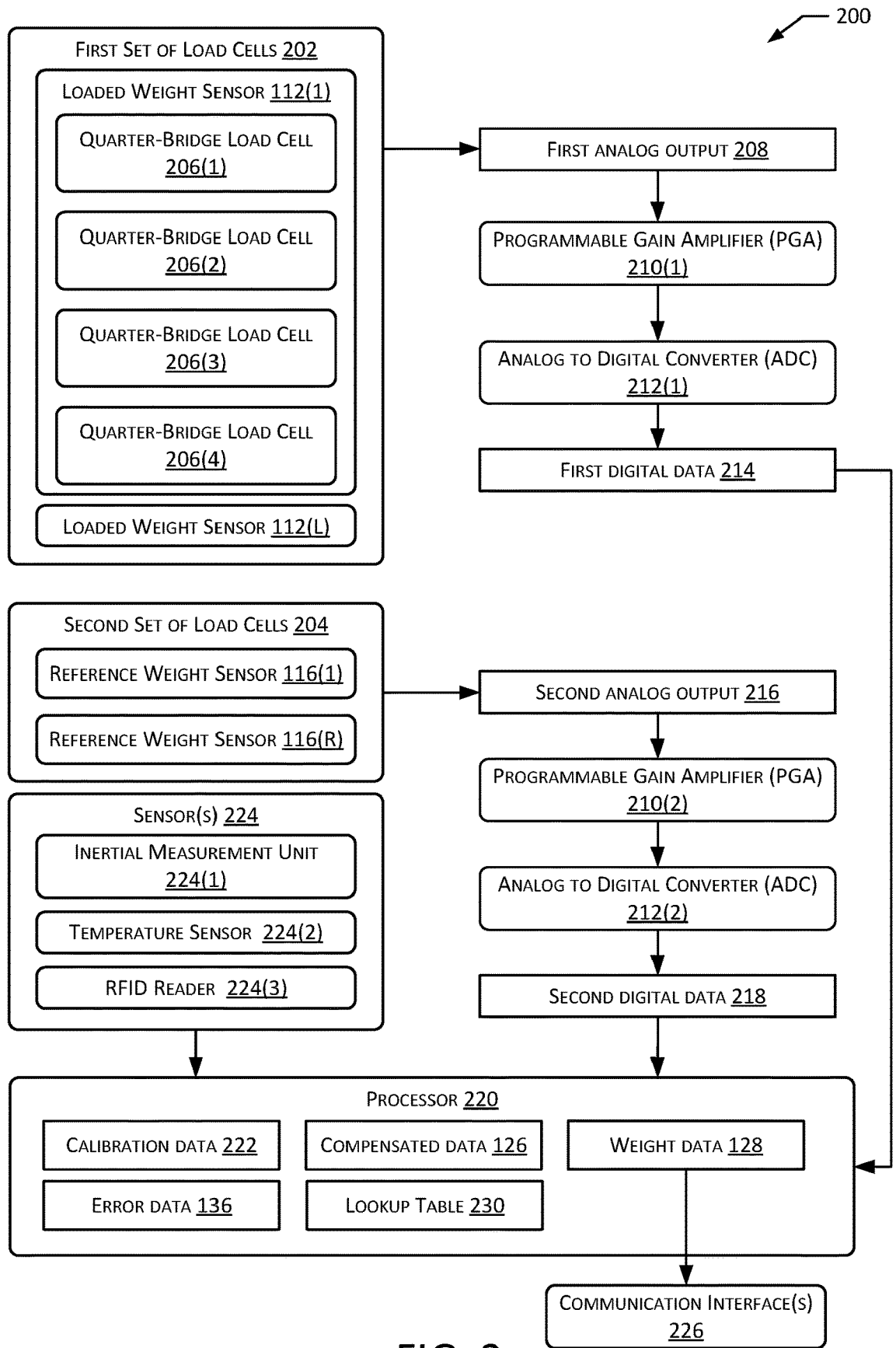
FIG. 2 is a block diagram of a portion of the apparatus, according to some implementations.

FIG. 2 is a block diagram 200 of a portion of the apparatus 102 and the electronics 122 therein, according to some implementations. For ease of illustration, and not as a limitation, components such as a power supply, indicator light(s), and so forth have been omitted.

The apparatus 102 includes a first set of loads cells 202 and a second set of load cells 204. The first set of load cells 202 comprise one or more LWSs 112(1), 112(2), . . . 112(L). The second set of load cells 204 comprise one or more RWSs 116(1), 116(2), 116(3), . . . 116(R). Each set of load cells may comprise one or more load cells or other components that measure an applied force. The number or count of load cells in each set may be the same or different. For example, the first set of load cells 202 may comprise four QBLCs 206(1)-(4) while the second set of load cells 204 may comprise four QBLCs 206(5)-(8) or a single FBLC.

In some implementations the load cells in the first set of load cells 202, the second set of load cells 204, or both, may include a temperature compensation element. For example, the load cells may include a resistor with a temperature coefficient that attempts to cancel out changes due to temperature at an analog level.

During operation, the first set of load cells 202 produce first analog output 208. For example, the first analog output 208 may comprise a voltage produced by a Wheatstone bridge arrangement of load cells. A first programmable gain amplifier (PGA) 210(1) has an input that is connected to an output of the first set of load cells 202. For example, the output from the LWS 112(1) may be connected to the PGA 210(1). In some implementations each LWS 112 may have a corresponding PGA 210. In other implementations a single PGA 210 may be multiplexed and used in conjunction with a plurality of LWS 112. A first analog to digital converter (ADC) 212(1) has an input connected to an output of the first PGA 210(1). The first ADC 212(1) provides first digital data 214 at the output of the first ADC 212(1). For example, the first digital data 214 may comprise a digital representation of at least a portion of the first analog output 208.

During operation, the second set of load cells 204 produce second analog output 216. For example, the second analog output 216 may comprise a voltage produced by a Wheatstone bridge arrangement of load cells. A second PGA 210(2) has an input that is connected to an output of the second set of load cells 204. For example, the output from the RWS 116(1) may be connected to the PGA 210(2). In some implementations each RWS 116 may have a corresponding PGA 210. In other implementations a single PGA 210 may be multiplexed and used in conjunction with a plurality of RWS 116. A second ADC 212(2) has an input connected to an output of the second PGA 210(2). The second ADC 212(2) provides second digital data 218 at the output of the first ADC 212(1). For example, the second digital data 218 may comprise a digital representation of at least a portion of the second analog output 216.

The first digital data 214 and the second digital data 218 are provided as input to a processor 220. The processor 220 may comprise a microcontroller, microprocessor, field-programmable gate array, and so forth. The processor 220 may perform one or more operations to determine one or more of calibration data 222, error data 136, compensated data 126, weight data 128, and so forth.

First calibration data 222(1) may comprise data that is indicative of a calibration value of the first digital data 214 when the platform 110 is empty of items 104. For example, during manufacture or during a calibration operation, while the platform 110 is unloaded, first digital data 214 associated with analog signals acquired after a settling time has elapsed may be used. The first calibration data 222(1) may be determined that comprises an LWS calibration value reported by the LWS 112 while the platform 110 is unloaded.

The first calibration data 222(1) may be used to, in effect, zero the output from the LWS 112 to account for the weight of the platform 110. For example:

$$\text{LWS Calibrated Value} = \text{LWS Current Value} - \text{LWS Calibration Value} \quad \text{EQUATION 1}$$

For example, during a calibration process the output from the LWS 112 is a value of "21300", so the LWS calibration value is "21300". This value is representative of a zero load. During later operation, while the platform 110 is supporting a load of item(s) 104, the LWS current value is "28,500". The LWS calibrated value would then be 28500-21300=7200. However, this calibrated value may still include drift due to environmental and other factors.

Second calibration data 222(2) may also be determined that comprises a value reported by the RWS 116 at some time. For example, the first calibration data 222(1) and the second calibration data 222(2) may be determined at the same or proximate times, such as during a calibration process at time of manufacture or setup. The second calibration data 222(2) is indicative of an RWS calibration value.

The second calibration data 222(2) may be used to determine how the output of the RWS 116 has changed from one time to another. Those changes are due to factors such as age, environment, and so forth. Because the LWS 112 and the RWS 116 are subjected to the same factors, the LWS 112 may be assumed to change in a similar fashion as the RWS 116.

The error data 136 may be determined as a difference between a current and previous output from the RWS 116. For example, the error data 136 may be determined as follows:

$$\text{Error data} = \text{RWS current value} - \text{RWS calibration value} \quad \text{EQUATION 2}$$

Continuing the example, during the calibration process the output from the RWS 116 may be a value of "17500". During later operation, while the platform 110 is supporting the load of item(s) 104, the RWS current value is "18100". The error data would then be 18100−17500=600.

The compensated data 126 may then be calculated using the calibrated load value and the error data 136. This may be calculated using the following equation:

$$\text{Compensated data} = \text{Calibrated Load Value} - \text{Error Data} \quad \text{EQUATION 3}$$

Continuing the example, the compensated data 126 would be 7200−600=6600. The compensated data 126 may then be used to determine weight data 128. For example, the value of 6600 may be used to retrieve from a lookup table (LUT) 230 a weight value indicative of 1.275 kg. The weight value may be included in the weight data 128.

In other implementations, other data structures or techniques may be used to determine the weight data 128. For example, a formula or function may be used to process the compensated data 126 and determine a weight value.

In another implementation, a difference may be calculated between the first digital data 214 and the second digital data 218. For example, individual values in the second digital data 218 may be subtracted from individual values in the first digital data 214. The resulting difference may then be used to determine a preliminary weight value that includes the weight of the platform 110 and the load of item(s) 104 or other objects on the platform 110. A predetermined weight of the platform 110 may then be subtracted from the preliminary weight value to determine the compensated data 126. The compensated data 126 may then be used to determine the weight data 128.

The calibration operation performed by the processor 220 to generate the calibration data 222 may be initiated by the weight data 128 indicating a weight value below the threshold amount, manual input such as a user operating a control on the apparatus 102, a timer expiring, a command received from an external device, a manufacturing or assembly process, and so forth. For example, during assembly or installation the platform 110 may be emptied and the calibration operation performed.

In other implementations the compensated data 126 may be determined using other techniques. For example, the compensated data 126 may comprise a compensated value determined as a difference between a first moving average of the values in the first digital data 214 and a second moving average of the values in the second digital data 218.

The processor 220 uses the compensated data 126 to determine the weight data 128. The compensated data 126 may comprise a series of compensated values. In one implementation, a given compensated value may be looked up in a lookup table (LUT) 230 to determine a corresponding weight value. For example, the LUT 230 may associate a value of "6600" with a weight value of "1.275 kg". The weight data 128 may comprise an individual weight value, or a series of weight values. In another implementation, a function or other expression may relate a particular compensated value or range of compensated values with a particular weight value.

The processor 220 or other devices of the apparatus 102 may apply filters to the data. For example, an analog filter may be used to filter the first analog output 208 before input to the first PGA 210(1). In another example, a digital signal processor (DSP) may apply a filtering function to one or more of the first digital data 214, the second digital data 218, the calibration data 222, the compensated data 126, the weight data 128, and so forth.

The apparatus 102 may include one or more additional sensors 224. An inertial measurement unit (IMU) 224(1) may include one or more accelerometers or gyroscopes. The IMU 224(1) may generate movement data indicative of linear movement or rotation. The movement data may be used by the processor 220 to determine if the apparatus 102 has been moved, presence of vibration at a given time, and so forth. For example, if the movement data indicates movement that exceeds a threshold value, the calibration operation may be performed. In another example, the movement data may be used to determine whether vibration of the apparatus 102 exceeds a vibration threshold. In response to this determination, the processor 220 may deactivate the first set of load cells 202, the second load cells 204, or other components until the vibration decreases below the vibration threshold.

The apparatus 102 may include a temperature sensor 224(2) to generate temperature data. The temperature data may be used as an additional parameter to determine the compensated data 126. For example, the load cells may have a specified operating temperature range. If the temperature data indicates a temperature value that is outside the specified operating temperature range, the resulting weight data 128 may be flagged as being potentially inaccurate. In another example, a correction factor associated with a temperature value may be applied to the compensated data 126 to determine the weight data 128. In yet another example, the temperature value may be used to select a particular LUT for use to determine the weight data 128.

The apparatus 102 may include a radio frequency identification (RFID) reader 224(3), near field communication (NFC) systems, and so forth, to read data from tags on the items 104, in the surrounding environment, and so forth. For example, the RFID reader 224(3) may be used to determine the type of item 104 that is present on the platform 110, to determine if more than one type of item 104 is present on the platform 110, and so forth. In another example, the RFID reader 224(3) may be used to interrogate and read a tag associated with a piece of furniture, and so forth. For example, the RFID 224(3) may read a tag that designates a particular location within the facility, such as "break room 3" or "kitchen pantry". This information may be used to facilitate operation of the system, such as by specifying where a replenishment order is to be delivered to facilitate restock.

The apparatus 102 may include other sensors 224 as well. For example, the apparatus 102 may include a global positioning system (GPS) receiver, GLONASS receiver, cellular network transmitter or receiver, or other device to determine where the apparatus 102 is physically located. This information may be used to facilitate operation of the system, such as by specifying where a replenishment order is to be delivered to facilitate restock. In another example, the apparatus 102 may include a hygrometer to determine ambient humidity.

The apparatus 102 may include one or more communication interfaces 226. The communication interfaces 226 enable the apparatus 102, or components thereof, to communicate with other devices or components. The communication interfaces 226 may include one or more I/O interfaces. The I/O interfaces may comprise Inter-Integrated Circuit (I2C), Serial Peripheral Interface bus (SPI), Universal Serial Bus (USB) as promulgated by the USB Implementers Forum, RS-232, and so forth. The communication interfaces 204 may include one or more network interfaces. The network interfaces may include devices configured to couple to personal area networks (PANs), local area networks (LANs), wireless local area networks (WLANS), wide area networks (WANs), and so forth. For example, the network interfaces may include devices compatible with Ethernet, Wi-Fi, Bluetooth, ZigBee, LTE, 5G, and so forth.

Figure 3:
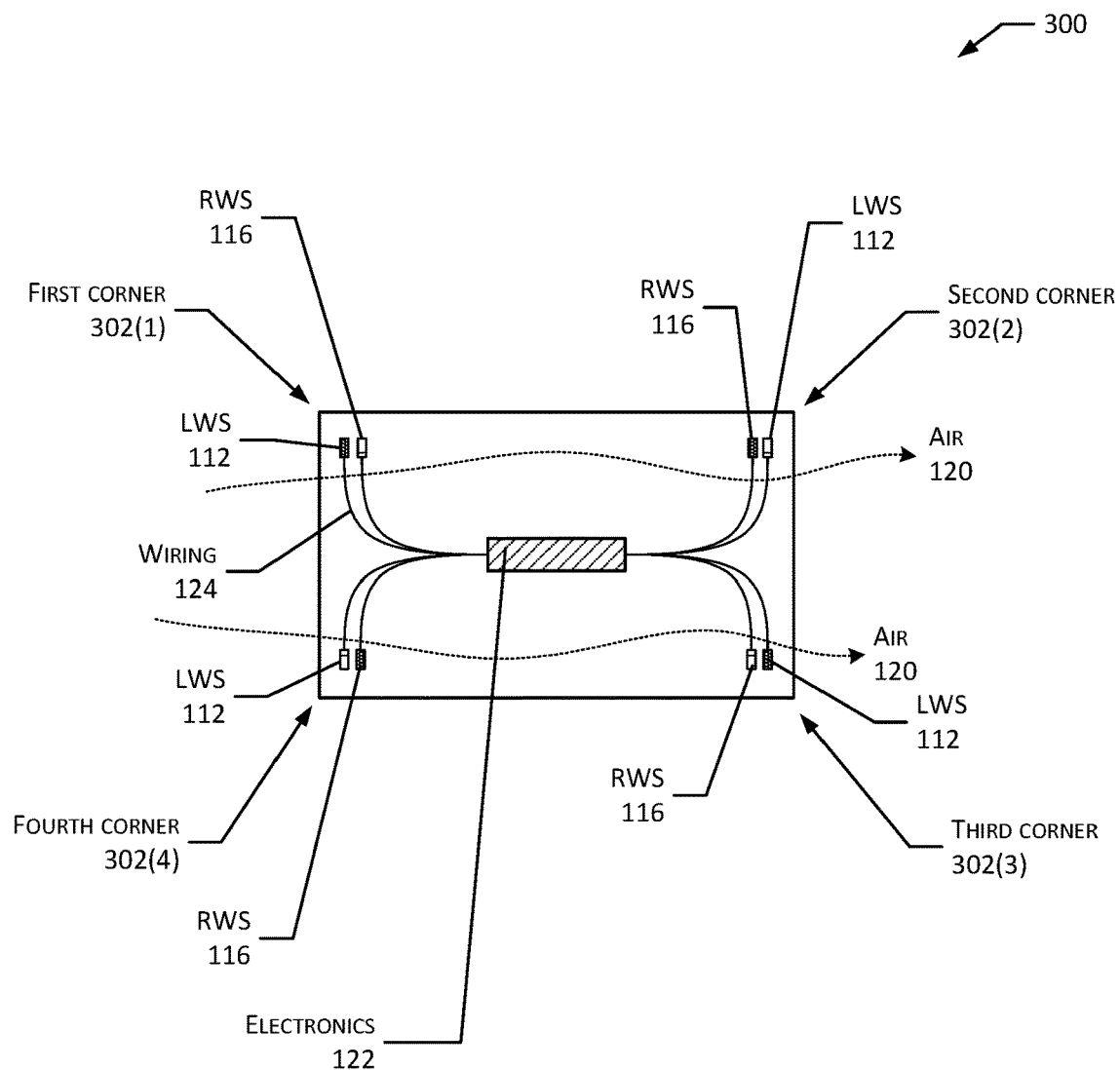
FIG. 3 illustrates a top view of a first configuration with loaded weight sensors having corresponding reference weight sensors, according to some implementations.

FIG. 3 illustrates a top view 300 of a first configuration with the LWS 112 having a corresponding RWS 116, according to some implementations. In this implementation, the LWS 112 comprises four QBLCs 206. The RWS 116 also comprises four QBLCs. As a result, the count of load cell components in the first set of load cells 202 is the same as the second set of load cells 204.

Proximate to each of four corners 302(1)-(4) of the platform 110 is a QBLC of the LWS 112 and a QBLC of the RWS 116. By placing the QBLCs of the LWS 112 and the RWS 116 near one another, they are subject to substantially the same factors such as local temperature, humidity, and so forth. For example, air 120 of a particular temperature and humidity will pass by a particular pair of QBLCs near a corner, affecting them similarly. The LWS 112 and the RWS 116 may be arranged in a common centroid configuration. Such a configuration may improve the exposure of the LWS 112 and the RWS 116 to the same factors.

In other implementations, other configurations of load cells may be used. For example, instead of a single LWS 112 with QBLCs at each corner, HBLCs or FBLCs may be used.

The apparatus 102 may include one or more features, channels, ducts, fenestrations, and so forth to direct passage of air 120 through and within the apparatus 102. The LWS 112 and the RWS 116 may be located within a common volume or plenum. This facilitates the LWS 112 and the RWS 116 being exposed to the same factors such as temperature, humidity, and so forth.

Figure 4:
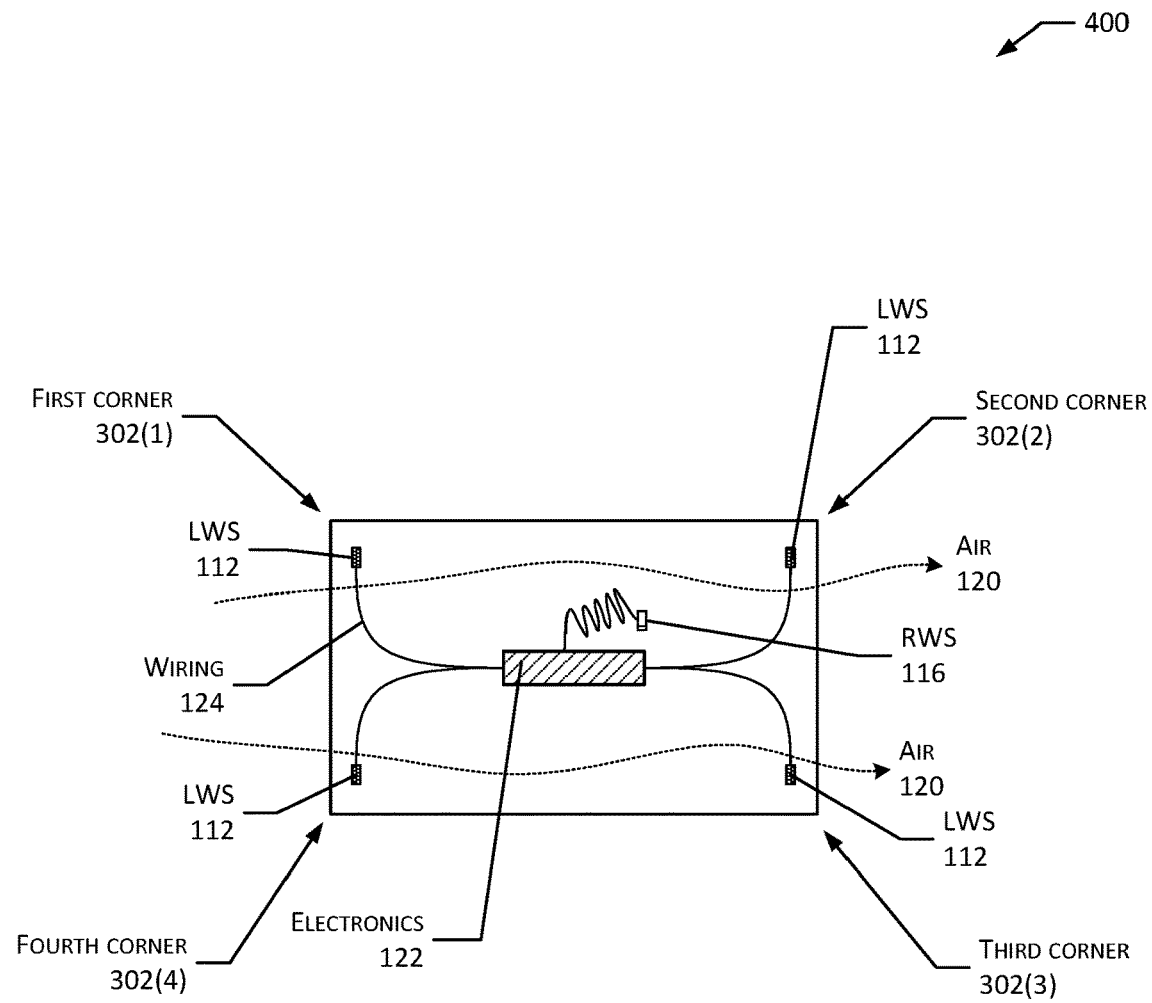
FIG. 4 illustrates a top view of a second configuration in which the quantity of loaded weight sensors differs from the reference weight sensors, according to some implementations.

FIG. 4 illustrates a top view 400 of a second configuration in which the quantity of LWSs 112 differs from the quantity of RWSs 116, according to some implementations. For example, in this implementation the LWS 112 comprises four QBLCs 206 proximate to the corners 302(1)-(4).

Instead of a corresponding RWS 116 load cell near each of the QBLCS, the RWS 116 comprises a single FBLC. In this illustration, the single FBLC of the RWS 116 is located within a perimeter formed by the four QBLCs 206 of the LWS 112. In other implementations the single FBLC of the RWS 116 may be located elsewhere with respect to the apparatus 102. In other implementations, other load cell configurations may be used. For example, the RWS 116 may comprise a QBLC, HBLC, and so forth. In another implementation, not shown, the quantity of RWSs 116 may exceed the quantity of LWS 112. For example, the first set of load cells 202 may comprise a single FBLC while the second set of load cells 204 may comprise two HBLCs.

Figure 5:
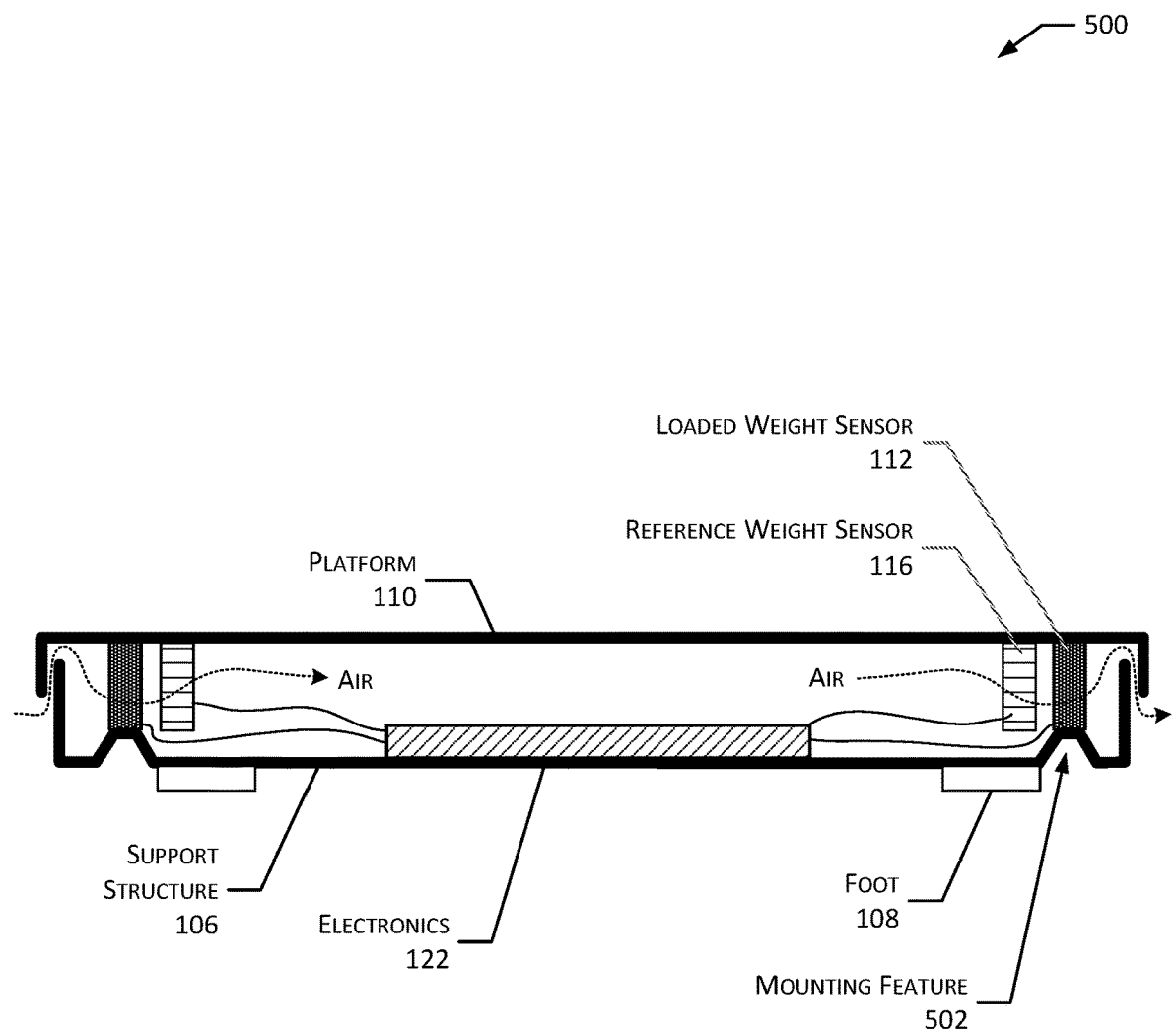
FIG. 5 illustrates a side view of another implementation in which the reference weight sensors are affixed to the platform.

FIG. 5 illustrates a side view 500 of another implementation in which the RWS 116 are affixed to the platform 110. In the implementation depicted here, the LWS 112 has a first end attached to a mounting feature 502 of the support structure 106. For example, the mounting feature 502 may be formed into the support structure 106. In another example, the mounting feature 502 may comprise a standoff. A first end of each load cell of the LWS 112 is attached to the support structure 106, such as at a respective mounting feature 502. A second end of each load cell of the LWS 112 is attached to the platform 110.

A first end of each load cell of the RWS 116 is attached to the platform 110, while the second end is not attached to the support structure 106. The RWS 116 may be considered "unloaded" in that it may not be subject to strain from the load comprising the platform 110 and any item 104 on the platform 110.

In some implementations, a thermal insulator 114 may be present between the first end of the load cells of the LWS 112 and the mounting feature 502. This thermal insulator 114 may be used to reduce heat transfer 118 between the platform 110 and the support structure 106.

In other implementations, various combinations of mounting of the RWS 116 or constituent load cells of the second group of load cells 204 may be used. For example, a first QBLC 206(1) may be attached to the support structure 106 while a second QBLC 206(2) is attached to the platform 110.

Figure 6:
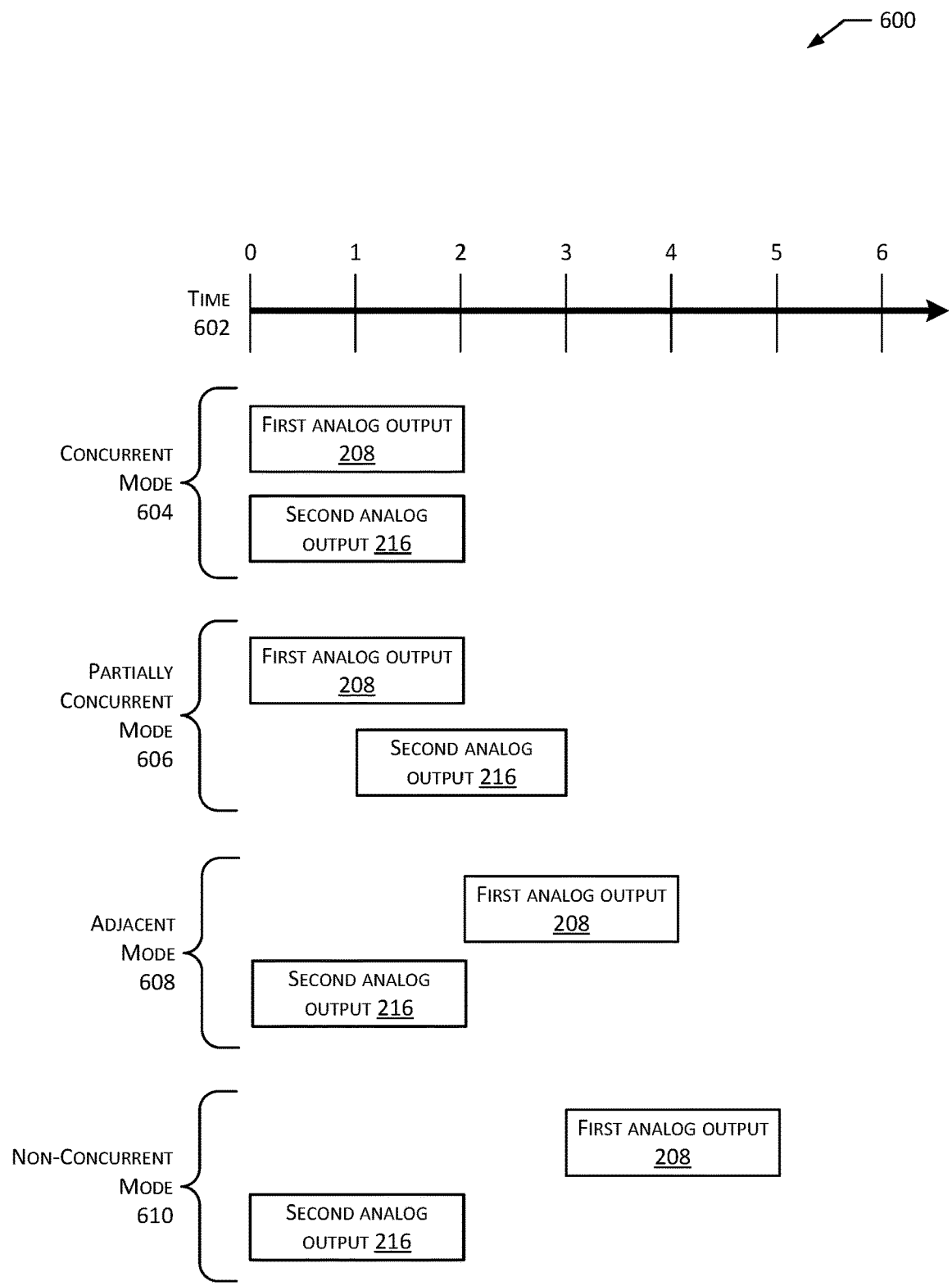
FIG. 6 depicts a graph of several implementations of timing for acquisition of analog output, according to some implementations.

FIG. 6 depicts a graph 600 of several implementations of timing for acquisition of analog output, according to some implementations. In this illustration time 602 is illustrated as increasing from left to right from time t=0 to time t=6. Four modes of operation are depicted: concurrent mode 604, partially concurrent mode 606, adjacent mode 608, and non-concurrent mode 610. The first analog output 208 and the second analog output 216 are depicted and the corresponding first digital data 214 and second digital data 218 are not shown. A timeslot may comprise a particular timeslot. For example, a timeslot may comprise the interval from time t=0 to t=1, from time t=1 to t=2, and so forth.

While operating in the concurrent mode 604, the first analog output 208 and the second analog output 216 are acquired during the same interval. For example, both the first analog output 208 and the second analog output 216 are obtained between time t=0 and t=2.

While operating in the partially concurrent mode 606, at least a portion of the analog output is obtained during a common interval of time. For example, the first analog output 208 may be acquired during time t=0 to t=2 while the second analog output 216 is acquired during time t=1 to t=3.

While operating in the adjacent mode 608, at least a portion of the analog output is obtained in series. For example, the second analog output 216 may be acquired during time t=0 to t=2 while the first analog output 208 is acquired during time t=2 to t=4. The adjacent mode 608 may provide reduced noise and otherwise improve performance by minimizing noise as only a single signal at a time is processed by the electronics 122.

While operating in the non-concurrent mode 610, the first analog output 208 and the second analog output 216 are acquired at different times, with some interval of time intervening. For example, the first analog output 208 may be acquired during time t=3 to t=5 while the second analog output 216 is acquired during time t=0 to t=2. The non-concurrent mode 610 may provide reduced noise and otherwise improve performance by minimizing noise as only a single signal at a time is processed by the electronics 122.

During the partially concurrent mode 606 or the non-concurrent mode 610, the first analog output 208 used to determine the compensated data 126 may be acquired before or after the second analog output 216. For example, in the non-concurrent mode 610, the first analog output 208 may be acquired before the second analog output 216.

In some implementations the time between the acquisition of first analog output 208 and the second analog output 216 may be constrained. For example, to be used to determine the compensated data 126, the first analog output 208 and the second analog output 216 may be acquired within a threshold interval, such as no more than 10 seconds.

The data acquisition rates of the first analog output 208 and the second analog output 216 may differ during operation. In one implementation, the first ADC 212(1) and the second ADC 212(2) may operate at the same or different sample rates. The duty cycles during which the first ADC 212(1) and second ADC 212(2) are operated may also differ. For example, the first set of load cells 202 may be operated to generate first digital data 214 every 200 milliseconds (ms) while the second set of load cells 204 may be operated to generate second digital data 218 once every 5 seconds. Such operation may reduce power consumption, heat dissipation, and so forth.

Figure 7:
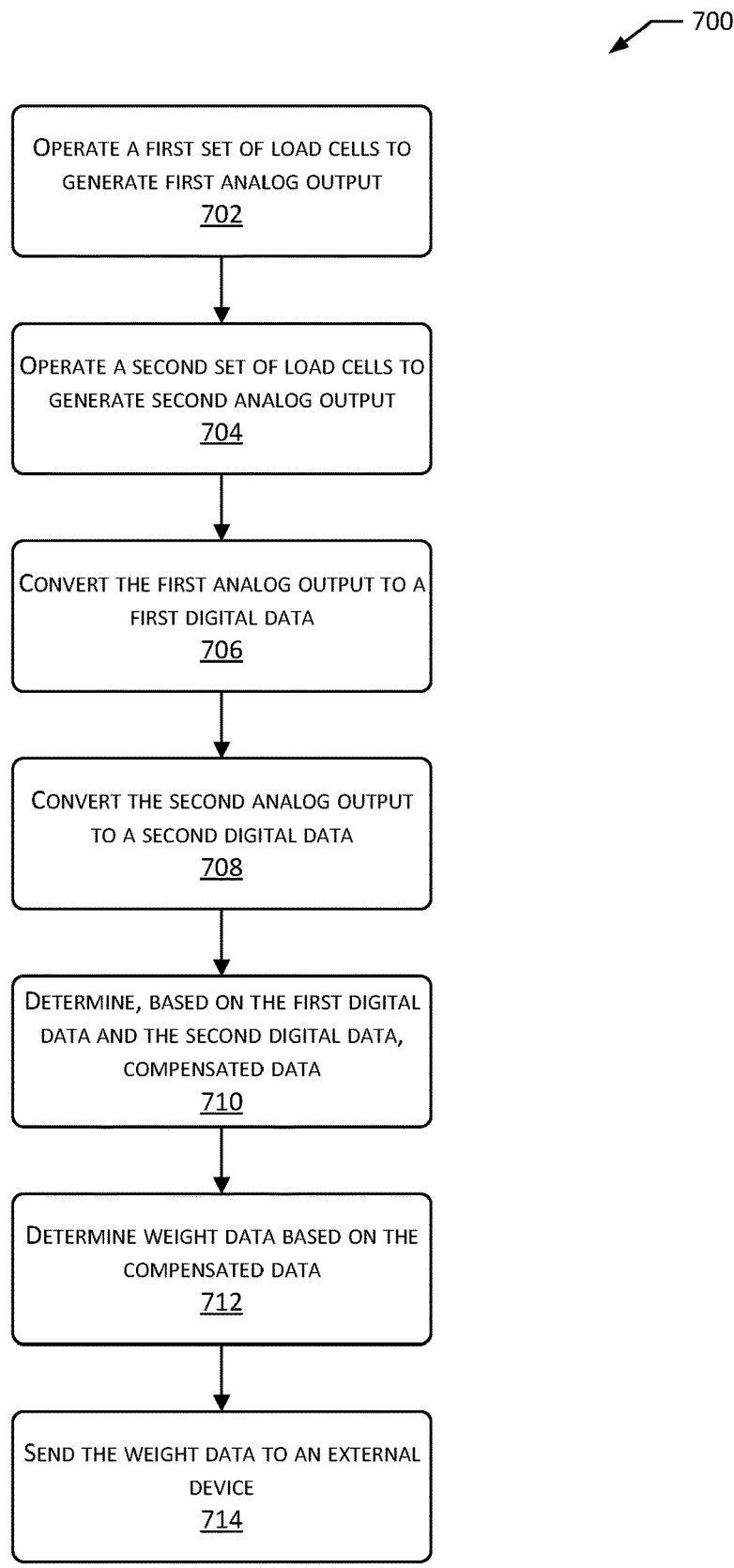
FIG. 7 is a flow diagram of a process for determining compensated data using loaded weight sensors and reference weight sensors, according to one implementation.

FIG. 7 is a flow diagram 700 of a process for determining compensated data 126 and corresponding weight data 128 using LWSs 112 and RWSs 116, according to one implementation. The process may be implemented at least in part by the electronics 122 of the apparatus 102.

At 702 a first set of load cells 202 are operated to generate first analog output 208. For example, the first set of load cells 202 may comprise four QBLCs 206(1)-(4) in a Wheatstone bridge.

At 704 a second set of load cells 204 are operated to generate second analog output 216. For example, the second set of load cells 204 may comprise four QBLCs 206(5)-(8) in a Wheatstone bridge.

At 706 the first analog output 208 is converted to first digital data 214. For example, the first ADC 212(1) may accept as input the first analog output 208 and generate as output first digital data 214.

At 708 the second analog output 216 is converted to second digital data 218. For example, the second ADC 212(2) may accept as input the second analog output 216 and generate as output second digital data 218.

At 710, based on the first digital data 214 and the second digital data 218, compensated data 126 is determined. For example, values of the first digital data 214 may be used to determine the LWS calibrated value, while the second digital data 218 is used to determine the error data 136. The compensated data 126 may be calculated as a difference between the LWS calibrated value and the error data 136.

At 712 weight data 128 is determined based on the compensated data 126. For example, a compensated value in the compensated data 126 may be used to retrieve a value from a LUT 230 that indicates a particular weight value. The weight value may be provided as the weight data 128.

In some implementations the weight data 128 may comprise one or more of weight distribution or change in weight distribution. A weight distribution may comprise information indicative of the weights applied to particular LWS 112. For example, if four LWSs 112(1)-(4) are used, each supporting a different corner 302 of the platform 110, the weight distribution may be determined based on the resulting weight values generated by each LWS 112. Continuing the example, the weight distribution data may comprise information such as the weight values as associated with the respective LWS 112 or may comprise a percentage value of total weight determined by summing the weight values for all four of the LWSs 112(1)-(4). In some implementations the weight distribution data may comprise information indicative of a weight distribution of a weight change. A change in weight between a first time and a second time may be determined. The weight distribution data may be used to determine where on the platform 110 an item 104 was picked or placed from.

At 714, at least a portion of the weight data 128 is sent to an external device. For example, the weight data 128 may be sent using the communication interface 226. Continuing the example, the weight data 128 may be sent to the inventory management system 132. In some implementations the error data 136 or other information may be sent to an external device.

By using the LWS 112 and the RWS 116, the apparatus 102 does not need to be zeroed during operation. For example, the use of the RWS 116 removes the need to unload the platform 110 and perform a zeroing operation to maintain accuracy. As a result, the apparatus 102 may support a load for extended periods of time, and still provide accurate weight data 128. This significantly improves the utility of the apparatus 102 by removing the time and labor otherwise associated with performing a zeroing operation.

Additionally, because zeroing is not necessary with the apparatus 102, associated components may be omitted, further reducing the cost and complexity of the apparatus 102. For example, a button or other control to initiate a zeroing operation may be omitted, reducing the part count of the apparatus 102.

The implementations described above are provided for illustration, and not necessarily as limitations. For example, the apparatus 102 may include more than one platforms 110.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    converting first analog output from a first set of load cells to first digital data, wherein individual load cells of the first set of load cells are coupled to a first structure and a second structure;
    converting second analog output from a second set of load cells to second digital data, wherein individual load cells of the second set of load cells are coupled to either the first structure or the second structure;
    determining, based at least in part on the first digital data and the second digital data, compensated data;
    determining a first weight value based on the compensated data;
    determining calibration data; and
    determining a second weight value based at least in part on the calibration data.

2. The method of claim 1, the determining the compensated data comprising:
    calculating a difference between a first value of the first digital data and a second value of the second digital data.

3. The method of claim 1, further comprising:
    determining, at a first time, that the first weight value is less than a threshold value that is associated with no load on the second structure;
    at a second time after the first time, converting third analog output from the first set of load cells to third digital data;
    at a third time after the first time, converting fourth analog output from the second set of load cells to fourth digital data;
    wherein the calibration data is based on the third digital data and the fourth digital data; and
    wherein the determining the second weight value is performed at a fourth time after the third time.

4. The method of claim 1, wherein:
    the first digital data is representative of the first analog output from the first set of load cells during a first interval of time; and
    the second digital data is representative of the second analog output from the second set of load cells during a second interval of time, wherein at least a portion of the first interval of time does not include at least a portion of the second interval of time.

5. The method of claim 1, wherein individual ones of the first set of load cells are physically proximate to individual ones of the second set of load cells;
    converting third analog output from a third set of load cells to third digital data, wherein individual load cells of the third set of load cells are coupled to the first structure and the second structure;
    converting fourth analog output from a fourth set of load cells to fourth digital data, wherein individual load cells of the fourth set of load cells are coupled to either the first structure or the second structure and further wherein individual ones of the third set of load cells are physically proximate to individual ones of the fourth set of load cells;
    determining, based at least in part on the third digital data and the fourth digital data, second compensated data; and
    determining, based on the second compensated data, a third weight value.

6. An apparatus comprising:
    a first structure;
    a second structure;
    a first set of load cells comprising:
        a first load cell having a first end coupled to the first structure and a second end coupled to the second structure;
    a second set of load cells comprising:
        a second load cell that is coupled to one of either the first structure or the second structure; and
    electronic circuitry to:
        determine first digital data based on analog output from the first set of load cells, wherein the first digital data is representative of the analog output from the first set of load cells during a first interval of time;
        determine second digital data based on analog output from the second set of load cells, wherein the second digital data is representative of the analog output from the second set of load cells during a second interval of time, and at least a portion of the first interval of time does not include at least a portion of the second interval of time; and
        determine, based at least in part on the first digital data and the second digital data, compensated data.

7. The apparatus of claim 6, further comprising:
    a communication interface; and
    wherein the electronic circuitry determines the compensated data based at least in part on a difference between the first digital data and the second digital data; and the electronic circuitry further to:
        determine first weight data based on the compensated data; and
        send the first weight data using the communication interface.

8. The apparatus of claim 6, the electronic circuitry comprising:
    a first programmable gain amplifier (PGA) having an input connected to an output of the first set of load cells;

a first analog to digital converter (ADC) having an input connected to an output of the first PGA, wherein the first digital data is provided at the output of the first ADC;

a second PGA having an input connected to an output of the second set of load cells;

a second ADC having an input connected to an output of the second PGA, wherein the second digital data is provided at the output of the second ADC; and a processor having:
a first input connected to the output of the first ADC; and
a second input connected to the output of the second ADC.

9. The apparatus of claim 6, wherein the second load cell is coupled to the second structure.

10. The apparatus of claim 6, wherein the first load cell is mounted in a first orientation with respect to the first structure and the second load cell is mounted in the first orientation with respect to the first structure.

11. The apparatus of claim 6, wherein a first end of the second load cell is coupled to one of either the first structure proximate to the first end of the first load cell or the second structure proximate to the second end of the first load cell.

12. The apparatus of claim 6, wherein:
heat transfer from the first structure to the first load cell has a first value,
heat transfer from the first structure to the second load cell has a second value,
the second value is within 25% of the first value, and
the first load cell and the second load cell are located within a common volume.

13. The apparatus of claim 6, wherein individual load cells in the first set of load cells comprise a temperature compensation element and individual load cells in the second set of load cells comprise a temperature compensation element.

14. The apparatus of claim 6, further comprising a thermal insulator between the second end of the first load cell and the second structure.

15. The apparatus of claim 6, wherein the first set of load cells consists of more load cells than the second set of load cells.

16. The apparatus of claim 6, wherein:
the second structure comprises a platform with a first corner, a second corner, a third corner, and a fourth corner;
the first set of load cells further comprising:
the first load cell having the second end coupled to the first corner of the platform,
a third load cell having a first end coupled to the first structure and a second end coupled to the second corner of the platform,
a fourth load cell having a first end coupled to the first structure and a second end coupled to the third corner of the platform, and
a fifth load cell having a first end coupled to the first structure and a second end coupled to the fourth corner of the platform; and
the second set of load cells further comprising:
a sixth load cell that is coupled to either the first structure or the platform,
a seventh load cell that is coupled to either the first structure or the platform, and
an eighth load cell that is coupled to either the first structure or the platform.

17. The apparatus of claim 6, wherein individual load cells in the first set of load cells and individual load cells in the second set of load cells exhibit a first set of characteristics.

18. The apparatus of claim 6, wherein the second structure comprises a weighing platform.

19. The apparatus of claim 6, wherein each load cell comprises a third structure and a strain gauge affixed to the third structure.

20. An apparatus comprising:
a communication interface;
a support structure;
a platform having a first corner, a second corner, a third corner, and a fourth corner;
a first set of load cells comprising:
a first load cell having a first end and a second end, wherein the first end is coupled to the support structure and the second end is coupled to the first corner of the platform;
a second load cell having a first end and a second end, wherein the first end is coupled to the support structure and the second end is coupled to the second corner of the platform;
a third load cell having a first end and a second end, wherein the first end is coupled to the support structure and the second end is coupled to the third corner of the platform; and
a fourth load cell having a first end and a second end, wherein the first end is coupled to the support structure and the second end is coupled to the fourth corner of the platform;
a second set of load cells comprising:
proximate to the first load cell, a fifth load cell having a first end and a second end, wherein the first end is coupled to the support structure and the second end is not coupled to the platform;
proximate to the second load cell, a sixth load cell having a first end and a second end, wherein the first end is coupled to the support structure and the second end is not coupled to the platform;
proximate to the third load cell, a seventh load cell having a first end and a second end, wherein the first end is coupled to the support structure and the second end is not coupled to the platform; and
proximate to the fourth load cell, an eighth load cell having a first end and a second end, wherein the first end is coupled to the support structure and the second end is not coupled to the platform; and
electronics to:
determine first digital data based on first analog output from the first set of load cells;
determine second digital data based on second analog output from the second set of load cells;
determine, based at least in part on a difference between the first digital data and the second digital data, compensated data;
determine a first weight value based on the compensated data;
determine, at a first time, that the first weight value is less than a threshold value that is associated with no load on the platform;
at a second time after the first time, determine third digital data based on third analog output from the first set of load cells;

at a third time after the first time, determine fourth digital data based on fourth analog output from the second set of load cells; and determine, based on the third digital data and the fourth digital data, calibration data.

* * * * *